(12) United States Patent
Hotomi et al.

(10) Patent No.: US 11,365,574 B2
(45) Date of Patent: Jun. 21, 2022

(54) HINGE AND HINGE MONITORING METHOD

(71) Applicant: SIMOTEC CO., LTD., Higashiosaka (JP)

(72) Inventors: Hideo Hotomi, Higashiosaka (JP); Takashi Shimonishi, Higashiosaka (JP)

(73) Assignee: SIMOTEC CO., LTD., Higashiosaka (JP)

( * ) Notice: Subject to any disclaimer, the term of this patent is extended or adjusted under 35 U.S.C. 154(b) by 275 days.

(21) Appl. No.: 16/650,408

(22) PCT Filed: Sep. 20, 2018

(86) PCT No.: PCT/JP2018/034809
§ 371 (c)(1),
(2) Date: Mar. 25, 2020

(87) PCT Pub. No.: WO2019/059276
PCT Pub. Date: Mar. 28, 2019

(65) Prior Publication Data
US 2021/0207413 A1 Jul. 8, 2021

(30) Foreign Application Priority Data
Sep. 25, 2017 (JP) .............................. JP2017-184236

(51) Int. Cl.
*E05D 11/00* (2006.01)
*E05D 3/02* (2006.01)
(Continued)

(52) U.S. Cl.
CPC ................ *E05D 11/00* (2013.01); *E05D 3/02* (2013.01); *G08B 23/00* (2013.01); *A47J 36/06* (2013.01);
(Continued)

(58) Field of Classification Search
CPC ...................................................... E05D 11/00
See application file for complete search history.

(56) References Cited

U.S. PATENT DOCUMENTS 7,756,619 B2 7/2010 Ichikawa et al.
8,653,982 B2 2/2014 Yulkowski et al.
(Continued)

FOREIGN PATENT DOCUMENTS

CN 1880793 A 12/2006
EP 0867225 A2 9/1998
(Continued)

OTHER PUBLICATIONS

USPTO Notice of Allowance for corresponding U.S. Appl. No. 16/650,401; dated Mar. 31, 2021.
(Continued)

*Primary Examiner* — Travis R Hunnings
(74) *Attorney, Agent, or Firm* — Cantor Colburn LLP

(57) ABSTRACT

Provided is a hinge that can prevent a defect, a failure, or the like with greater certainty, and enables inspection and repair work to be efficiently carried out. A hinge comprises a first wing member that is connected to a first connection object and a second wing member that is connected to a second connection object. The hinge rotatably connects the second connection object to the first connection object. The hinge comprises a sensor that detects a change inside the hinge or in a prescribed external environment change in the external environment detected by the sensor to the outside via a sensor that detects a prescribed component constituting an odor, a gas sensor that detects a prescribed gas, a dust sensor that detects the amount of dust, and a illumination sensor that detects brightness.

2 Claims, 4 Drawing Sheets

(51) Int. Cl.
    *G08B 23/00* (2006.01)
    *A47J 36/32* (2006.01)
    *A47J 36/06* (2006.01)
    *G03G 21/16* (2006.01)
    *G06F 1/16* (2006.01)
    *H04M 1/02* (2006.01)
    *H04N 1/00* (2006.01)

(52) U.S. Cl.
    CPC .......... *A47J 36/321* (2018.08); *E05Y 2800/10* (2013.01); *E05Y 2800/176* (2013.01); *E05Y 2900/132* (2013.01); *E05Y 2900/148* (2013.01); *E05Y 2900/536* (2013.01); *E05Y 2900/602* (2013.01); *E05Y 2900/606* (2013.01); *E05Y 2900/614* (2013.01); *G03G 21/1628* (2013.01); *G06F 1/1681* (2013.01); *H04M 1/0202* (2013.01); *H04N 1/00323* (2013.01); *H04N 1/00557* (2013.01)

(56) References Cited

U.S. PATENT DOCUMENTS

| | | | |
|---|---|---|---|
| 8,786,435 | B2 | 7/2014 | Barnett et al. |
| 8,829,809 | B2 | 9/2014 | Barnett et al. |
| 10,154,155 | B2 | 12/2018 | Hamada et al. |
| 10,229,567 | B2 | 3/2019 | Ricks et al. |
| 10,415,294 | B2 | 9/2019 | Yulkowski et al. |
| 10,663,321 | B1 * | 5/2020 | Martin .............. E05D 11/0081 |
| 2006/0167656 | A1 * | 7/2006 | Shimonishi ............ H04Q 9/00 702/182 |
| 2006/0287788 | A1 | 12/2006 | Ichikawa et al. |
| 2009/0243509 | A1 | 10/2009 | Barnett et al. |
| 2011/0006893 | A1 | 1/2011 | Barnett et al. |
| 2011/0006896 | A1 | 1/2011 | Barnett et al. |
| 2011/0012532 | A1 | 1/2011 | Barnett et al. |
| 2011/0012541 | A1 | 1/2011 | Finch |
| 2011/0012730 | A1 | 1/2011 | Finch et al. |
| 2017/0070619 | A1 | 3/2017 | Hamada et al. |
| 2017/0260783 | A1 | 9/2017 | Crolley |

FOREIGN PATENT DOCUMENTS

| | | |
|---|---|---|
| EP | 0867225 A3 | 12/2000 |
| JP | H10263435 A | 10/1998 |
| JP | H1139586 A | 2/1999 |
| JP | 2000203134 A | 7/2000 |
| JP | 2005269552 A | 9/2005 |
| JP | 2008107863 A | 5/2008 |
| JP | 2008177653 A | 7/2008 |
| JP | 2009211332 A | 9/2009 |
| JP | 2009237046 A | 10/2009 |
| JP | 2010109589 A | 5/2010 |
| JP | 2010200397 A | 9/2010 |
| JP | 2011512044 A | 4/2011 |
| JP | 2011100353 A | 5/2011 |
| JP | 2013245083 A | 12/2013 |
| JP | 2017055246 A | 3/2017 |
| WO | 2004047042 A1 | 6/2004 |
| WO | 2015194577 A1 | 12/2015 |

OTHER PUBLICATIONS

JPO Notice of Reasons for Refusal for corresponding JP Application No. 2017-184236; dated, Sep. 28, 2021.
International Search Report; International Application No. PCT/JP2018/034806; International Filing Date Sep. 20, 2018; Date of Mailing of ISR dated Dec. 18, 2018; 6 pages.
International Search Report; International Application No. PCT/JP2018/034809; International Filing Date Sep. 20, 2018; Date of Mailing of ISR dated Dec. 18, 2018; 2 pages.
International Preliminary Report on Patentability for International Application No. PCT/JP2018/034809; dated Oct. 11, 2019.
International Preliminary Report on Patentability for International Application No. PCT/JP2018/034806; dated Jan. 16, 2020.
JPO Final Notification of Reasons for Refusal for corresponding JP Application No. 2017-184235; dated Jan. 4, 2022.
JPO Notice of Reasons for Refusal for corresponding JP Application No. 2017-184236; dated Apr. 6, 2021.
JPO Notice of Reasons for Refusal for correspodning JP Application No. 2017-184236; dated Mar. 25, 2021.
CNIPA Office Action for corresponding CN Application No. 201880062307.0; dated May 21, 2021.

* cited by examiner

HINGE AND HINGE MONITORING METHOD

CROSS REFERENCE TO RELATED APPLICATIONS

This is the U.S. national stage of application No. PCT/JP2018/034809, filed on Sep. 20, 2018. Priority under 35 U.S.C. § 119(a) and 35 U.S.C. § 365(b) is claimed from Japanese Application No. 2017-184236, filed Sep. 25, 2017, the disclosure of which is also incorporated herein by reference.

TECHNICAL FIELD

The present invention relates to a hinge for openably linking a second linked object to a first linked object, and a hinge monitoring method.

BACKGROUND ART

There has been known a technique concerning a hinge that includes a first wing member linked to a first linked object and a second wing member linked to a second linked object, the hinge rotatably linking the second linked object to the first linked object (c.f. Patent Literature 1).

Specific examples of the use in which the hinge is provided include: a use in which an original pressing plate is openably linked to the body of a multi-function machine which includes an original reader; a use in which a hatch (lid) for exchanging a toner cartridge is openably linked to the body of a printer; a use in which a screen part is openably linked to the body of a laptop computer or a mobile phone; a use in which a hood is openably linked to the body of a car; a use in which a toilet seat is openably linked to a toilet; a use in which a lid is openably linked to a pot of a rice cooker; and a use in which a window or a door is openably linked to an opening that communicates with the inside of a furnace or a workroom.

As for the above hinge, an external person such as a maintenance contractor has grasped the state of the hinge such as a defect or a failure or the surrounding conditions of the hinge mainly through periodically conducted inspection work, notification made by a user, or the like.

CITATIONS LIST

Patent Literature

Patent Literature 1: JP-A 2009-237046

SUMMARY OF INVENTION

Technical Problems

However, as for the above hinge, the state of the hinge or the surrounding conditions of the hinge greatly vary depending on the installed environment, the use state, or the like. In addition, there are variations in inspection technique and attention among inspectors, users, and the like who are to grasp the state of the hinge or the surrounding conditions of the hinge.

There has thus been a case where, at the time of conduction of the periodic inspection work or reception of the notification from the user, it is already too late or a large-scale repair is required. There has also been a case where, by conduction of the periodic inspection work, reception of the notification from the user, or the like, the inspection work, the repair work, or the like is conducted even when the repair work or the like is not required.

The present invention has been made in view of the circumstances as described above, and it is an object of the present invention to provide a hinge and a hinge monitoring method, which can more reliably prevent a defect, a failure, and the like from occurring and efficiently conduct repair and inspection work.

Solutions to Problems

The problem to be solved by the present invention is as described above, and solutions to the problem will be described below.

That is, the solution is a hinge including: a first wing member linked to a first linked object; and a second wing member linked to a second linked object, the hinge being rotatably linking the second linked object to the first linked object, the hinge including: a sensor that detects a predetermined change in an external environment in the hinge or around the hinge; and a control unit that transmits, through a communication network to the outside, information on the change in the external environment detected by the sensor, in which the sensor is constituted by at least any one of an odor sensor that detects a predetermined component constituting an odor, a gas sensor that detects a predetermined gas, a dust sensor that detects an amount of dust, and an illumination sensor that detects illumination, the control unit determines whether or not the external environment change detected by the sensor is higher than the predetermined threshold, when the external environment change detected by the sensor is higher than the predetermined threshold, the control unit transmits the information on the change in the external environment detected by the sensor to the outside, the predetermined threshold can be set in a plurality of stage, and the control unit can also be set to determine whether or not the external environment change detected by the sensor is higher than the predetermined threshold in each of the plurality of stage.

The solution is a monitoring method for a hinge that includes a first wing member linked to a first linked object, and a second wing member linked to a second linked object, the hinge being rotatably linking the second linked object to the first linked object, a sensor provided in the hinge detecting a predetermined change in an external environment in the hinge or around the hinge; and a control unit transmitting, through a communication network to the outside, information on the change in the external environment detected by the sensor, in which the sensor is constituted by at least any one of an odor sensor that detects a predetermined component constituting an odor, a gas sensor that detects a predetermined gas, a dust sensor that detects an amount of dust, and an illumination sensor that detects illumination, the control unit determines whether or not the external environment change detected by the sensor is higher than the predetermined threshold, when the external environment change detected by the sensor is higher than the predetermined threshold, the control unit transmits the information on the change in the external environment detected by the sensor to the outside, the predetermined threshold can be set in a plurality of stage, and the control unit can also be set to determine whether or not the external environment change detected by the sensor is higher than the predetermined threshold in each of the plurality of stage.

Advantageous Effects of Invention

As the effects of the present invention, the following effects can be obtained.

That is, according to the present invention, it is possible to more reliably prevent a defect, a failure, and the like from occurring, and it is possible to efficiently conduct repair and inspection work.

DESCRIPTION OF EMBODIMENT

Next, a hinge according to an embodiment of the present invention will be described with reference to FIGS. 1 to 4.

The hinge links one member (first linked object) of two members to the other member (second linked object) rotatably (openably).

Specific examples of the use in which the hinge is provided include: a use in which an original pressing plate is openably linked to the body of a multi-function machine which includes an original reader; a use in which a hatch (lid) for exchanging a toner cartridge is openably linked to the body of a printer; a use in which a screen part is openably linked to the body of a laptop computer or a mobile phone; a use in which a hood is openably linked to the body of a car; a use in which a toilet seat is openably linked to a toilet; a use in which a lid is openably linked to a pot of a rice cooker; and a use in which a window or a door is openably linked to an opening that communicates with the inside of a furnace or a workroom.

Next, a box member 2 will be described as an example of one in which the hinge is provided.

Figure 1:
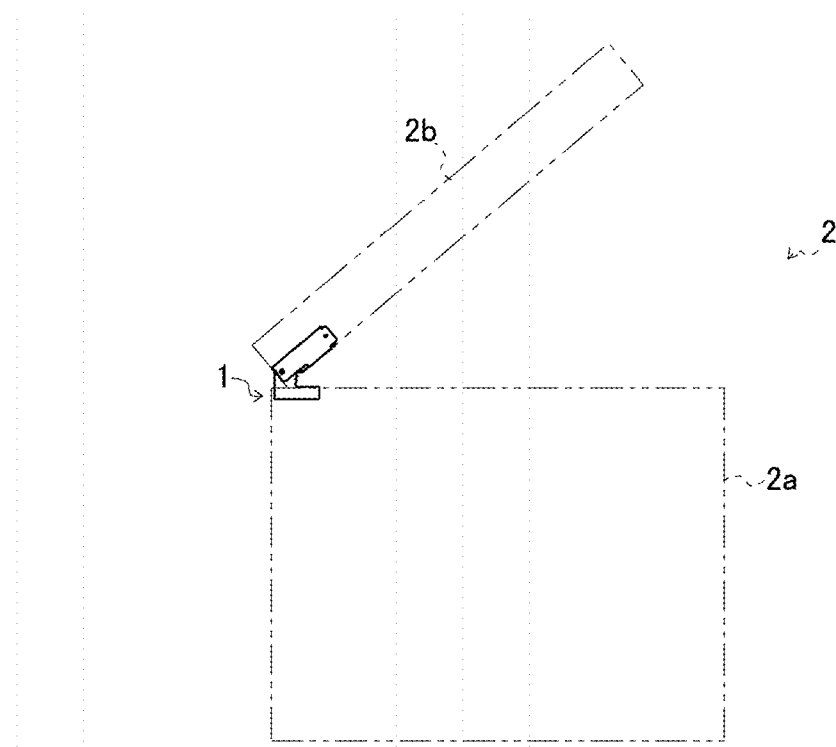
FIG. 1 is a right side view showing a box member provided with a hinge according to an embodiment of the present invention.
Figure 2:
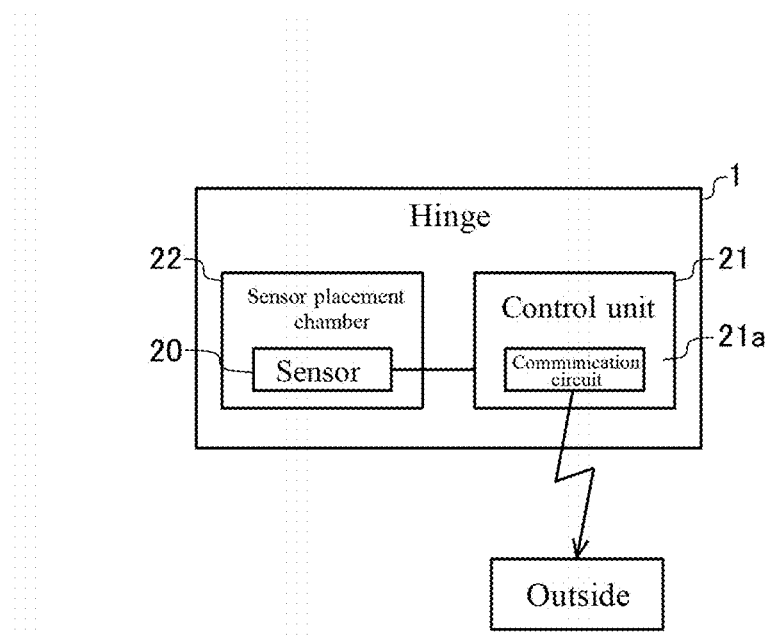
FIG. 2 is a block diagram showing the hinge.
Figure 3:
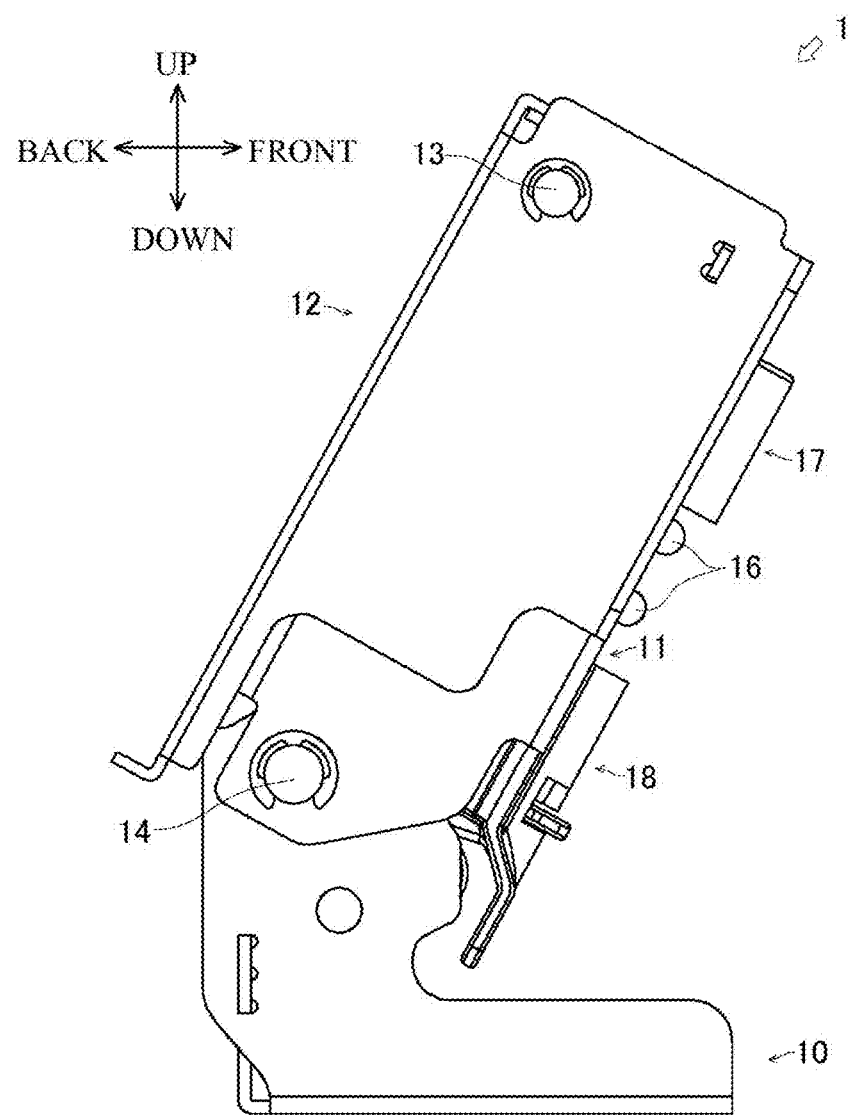
FIG. 3 is a right side view showing the hinge.
Figure 4:
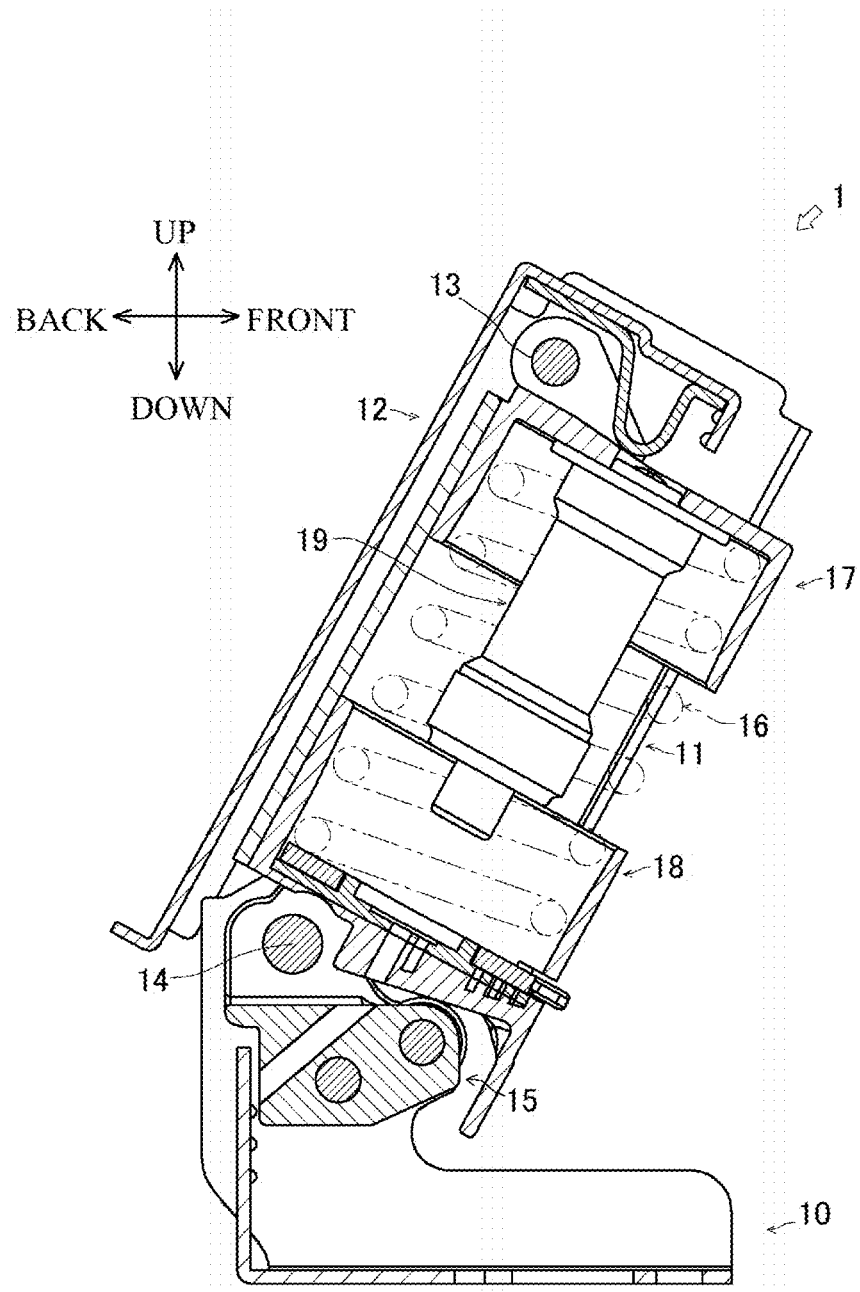
FIG. 4 is a sectional view showing the hinge.

As shown in FIG. 1, the box member 2 includes a body 2a and a lid 2b, and the lid 2b is rotatably linked to the body 2a via the hinge.

The body 2a is an embodiment of the first linked object to which the hinge is linked. The body 2a has an opening in a part (upper part) thereof, and is configured so that a predetermined thing can be housed therein or predetermined work can be conducted inside.

The lid 2b is an embodiment of the second linked object to which the hinge is linked. The lid 2b is disposed above the body 2a, and opens and closes the opening of the body 2a by rotating relatively to the body 2a.

Note that the one in which the hinge is provided is not limited to such a configuration but broadly includes ones in which one member is rotatably linked to the other member via the hinge.

Next, a hinge 1 will be described as an example of the hinge.

As shown in FIGS. 1 to 4, the hinge 1 rotatably links the lid 2b to the body 2a of the box member 2. The hinge 1 includes a lower fixing member 10, an intermediate member 11, an upper fixing member 12, an upper rotary shaft 13, a lower rotary shaft 14, a cam member 15, a spring 16, an upper slider 17, a lower slider 18, and a damper 19.

The lower fixing member 10 is an embodiment of the first wing member according to the present invention. A combination of the intermediate member 11, the upper fixing member 12, and the upper rotary shaft 13 is an embodiment of the second wing member according to the present invention.

The upper fixing member 12 is fixed to the lid 2b of the box member 2.

The upper rotary shaft 13 rotatably links the intermediate member 11 and the upper fixing member 12. The upper rotary shaft 13 is rotatably inserted through a through-hole formed in the intermediate member 11 and a through-hole formed in the upper fixing member 12.

The lower rotary shaft 14 is a rod-shaped member that rotatably links the lower fixing member 10 and the intermediate member 11. The lower rotary shaft 14 is rotatably inserted through a through-hole formed in the lower fixing member 10 and a through-hole formed in the intermediate member 11.

The cam member 15 has a through-hole, and the lower rotary shaft 14 is inserted through the through-hole.

The spring 16 extends to energize the intermediate member 11 to the lower fixing member 10 in a direction in which the lid 2b (to which the upper fixing member 12 has been fixed) opens with respect to the body 2a (to which the lower fixing member 10 has been fixed), and then supports the weight of the lid 2b. The spring 16 is made of a compression coil spring obtained by spirally forming a round bar made of spring steel.

The upper slider 17 is a member that supports the upper end of the spring 16. The upper slider 17 is housed in a space inside the intermediate member 11 and can slide along the longitudinal direction of the intermediate member 11.

The lower slider 18 is a member that supports the lower end of the spring 16. The lower slider 18 is housed inside the intermediate member 11 and can slide along the longitudinal direction of the intermediate member 11.

The damper 19 rotates the second wing member (the combination of the intermediate member 11, the upper fixing member 12, and the upper rotary shaft 13) with respect to the lower fixing member 10 in a direction in which the lid 2b of the box member 2 closes the body 2a, and when the angle formed between the lower surface of the lid 2b and the upper surface of the body 2a is small, the damper 19 reduces the rotational speed of the second wing member with respect to the lower fixing member 10. The damper 19 is a hydraulic damper 19, having one end fixed to the upper slider 17 and being disposed at a position surrounded by the spring 16.

The second wing member rotates with respect to the lower fixing member 10 in a direction in which the lid 2b of the box member 2 closes the body 2a, and when the angle between the lower surface of the lid 2b and the upper surface of the body 2a is reduced, the other end of the damper 19 comes into contact with the lower slider 18, and the damper 19 contracts in its longitudinal direction. When the damper 19 contracts in its longitudinal direction, the rotational speed of the second wing member with respect to the lower fixing member 10 is reduced due to viscous resistance of hydraulic oil filled in the damper 19.

Note that the hinge 1 is not limited to such a configuration but broadly includes ones that link one member (first linked object) of two members to the other member (second linked object) rotatably (openably).

Further, the hinge 1 includes a sensor 20 and a control unit 21.

The sensor 20 detects a change in predetermined external environment in the hinge 1 or around the hinge 1. The sensor 20 is constituted by at least any one of an odor sensor that detects a predetermined component constituting an odor, a gas sensor that detects a predetermined gas, a dust sensor that detects an amount of dust, and an illumination sensor that detects illumination.

The sensor 20 is disposed in a sensor placement chamber 22. The sensor placement chamber 22 is provided in a predetermined space where the sensor 20 can detect the change in the external environment inside the hinge 1 (e.g., in the first wing member or in the second wing member). Note that the sensor placement chamber 22 can also be disposed outside the hinge 1.

The control unit 21 controls various operations of the hinge 1 (sensor 20). The control unit 21 includes a storage device that stores various pieces of information, a clock function (e.g., a real-time clock), a communication circuit 21a that transmits various pieces of information to the outside by wire or wirelessly, an analog-to-digital conversion circuit, a micro-processing unit (MPU), and the like. The control unit 21 stores, into the storage device, information on the open/closed state of the second wing member, information on the change in the external environment detected by the sensor 20, information on the time when the sensor 20 has detected the change in the external environment, and the like. The control unit 21 transmits the information on the open/closed state of the second wing member, the information on the change in the external environment detected by the sensor 20, the information on the time when the sensor 20 has detected the change in the external environment, and the like from the communication circuit 21a to the outside (e.g., a management server, external communication equipment, a management center, etc.) through a communication network such as the internet. Further, the control unit 21 is configured to store information on the operation mode of the sensor 20 received from the outside, and to be operable based on instruction information received from the outside (information on timing at which the sensor 20 detects the change in the external environment, information on a predetermined threshold for determination by the control unit 21, information on the timing at which the control unit 21 transmits the information on the change in the external environment detected by the sensor 20, etc.).

Instead of being provided in the hinge 1, the control unit 21 can also be constituted by a microcomputer or the like built in the box member 2, or constituted by connection equipment such as a personal computer (PC) electrically connected to the box member 2. The hinge 1 can be made compact by disposing the control unit 21 outside the hinge 1 as described above.

Further, the control unit 21 can also be configured to transmit the information on the change in the external environment detected by the sensor 20, the information on the time when the sensor 20 detected a change in the external environment, and the like, from the communication circuit 21a to connection equipment (e.g., a beacon device, a wireless module, etc.) disposed inside the hinge 1 or outside the hinge 1 and connected to the control unit 21, and transmit the information to the outside via the connection equipment.

The sensor 20 constantly performs the operation of detecting the change in the external environment. The meaning of "the sensor 20 constantly performs the operation of detecting the change in the external environment" includes, in addition to a state in which the sensor 20 constantly detects the change in the external environment in a strict sense, a state in which the sensor 20 performs the operation of detecting the change in the external environment at extremely short intervals (e.g., at intervals of less than one second).

Each time the sensor 20 performs the operation of detecting the change in the external environment, the control unit 21 transmits the information on the change in the external environment detected by the sensor 20 and the information on the time when the sensor 20 has detected the change in the external environment to the outside. An external person receives the information on the change in the external environment detected by the sensor 20 and the information on the time when the sensor 20 has detected the change in the external environment via the management server or the like or directly from the hinge 1.

In this manner, it is possible to cause an external person at a remote location to constantly grasp the state of the hinge or the surrounding conditions of the hinge based on the information on the change in the external environment detected by the sensor 20, the information on the time when the sensor 20 has detected the change in the external environment, and the like. Therefore, according to the hinge 1, it is possible to more reliably prevent a defect, a failure, and the like from occurring, and it is possible to efficiently conduct repair and inspection work.

The sensor 20 can also be set to perform the operation of detecting the change in the external environment every predetermined time (at least every several seconds (e.g., every 10 minutes or every 180 minutes)). With such a configuration, it is possible to reduce the power consumption generated due to the operation by the sensor 20 to detect the change in the external environment while transmitting the information on the change in the external environment detected by the sensor 20, and the like to the outside, every predetermined time.

Further, the sensor 20 can also be set to perform the operation of detecting the change in the external environment only when the second wing member is in the closed state. With such a configuration, for example, in a case where various pieces of equipment such as the box member 2 provided with the hinge 1 are ones that greatly exhibit a change in the external environment despite there being no defect of the hinge 1 when the second wing member is in the open state, it is possible to prevent the external transmission of such confusing information at the time of the second wing member being in the open state.

Further, the sensor 20 can also be set to perform the operation of detecting the change in the external environment only when the second wing member is in the closed state. With such a configuration, for example, in a case where various pieces of equipment such as the box member 2 provided with the hinge 1 are ones that greatly exhibit a change in the external environment despite there being no defect of the hinge 1 when the second wing member is in the open state, it is possible to prevent the external transmission of such confusing information at the time of the second wing member being in the open state.

The control unit 21 can also be set to transmit, to the outside, the information on the change in the external environment detected by the sensor 20 and the information on the time when the sensor 20 has detected the change in the external environment every predetermined time (at least every several seconds (e.g., every 10 minutes, every 180 minutes, or every several days)). With such a configuration, while the information on the change in the external environment detected by the sensor 20, and the like is transmitted to the outside every predetermined time, to cause the external person at the remote location to grasp the state of the hinge or the surrounding conditions of the hinge every predetermined time, it is possible to reduce power consumption generated due to the operation by the control unit 21 to transmit the information on the change in the external environment, and the like to the outside.

The control unit 21 can also be set to determine whether or not the change in the external environment detected by the sensor 20 is higher than a predetermined threshold. The predetermined threshold is set in advance and stored into the storage device of the control device, and its value can also be changed by external communication or the like.

At this time, it can also be set such that, when the change in the external environment detected by the sensor 20 is higher than the predetermined threshold, the control unit 21 transmits the information on the change in the external environment detected by the sensor 20 in the case of the change being higher than the predetermined threshold and the information on the time when the sensor 20 has detected the change in the external environment to the outside. With such a configuration, when the change in the external environment detected by the sensor 20 exceeds the predetermined threshold (e.g., only when the change in the external environment detected by the sensor 20 has a high degree of abnormality), while the information on the change in the external environment detected by the sensor 20, and the like are transmitted to the outside, to cause the external person at the remote location to grasp the state of the hinge or the surrounding conditions of the hinge and that the change in the external environment detected by the sensor 20 has exceeded the predetermined threshold, it is possible to reduce power consumption generated due to the operation by the control unit 21 to transmit the information on the change in the external environment, and the like to the outside.

For example, when the sensor 20 is constituted by an odor sensor capable of detecting the odor of the hydraulic oil of the damper 19, in a case where the odor of the hydraulic oil component of the damper 19 detected by the sensor 20 is higher than a predetermined threshold, the control unit 21 transmits information on the odor of the hydraulic oil component of the damper 19 detected by the sensor 20 and information on the time when the sensor 20 has detected the odor of the hydraulic oil component of the damper 19 to the outside. In this manner, it is possible to cause the external person to grasp that a defect might have occurred in which the hydraulic oil has leaked from the damper 19. Thereby, for example, the defect of the hydraulic oil leakage of the damper 19, which has not occurred at the time of shipment, can be detected and notified to the outside at an early stage of delivery, or the like, to eliminate at an early stage the deterioration in defect conditions of the hinge caused by the hydraulic oil leakage of the damper 19.

Further, for example, when the hinge 1 is provided on a wall of a furnace and the sensor 20 is constituted by a gas sensor capable of detecting leakage of a flammable gas out of the furnace through the opening of the furnace, in a case where the combustible gas detected by the sensor 20 is higher than a predetermined threshold, the control unit 21 transmits information on the combustible gas detected by the sensor 20 and information on the time when the sensor 20 has detected the combustible gas to the outside. In this manner, it is possible to cause the external person to grasp that there is a possibility that the flammable gas has leaked from the inside of the furnace to the outside of the furnace due to a defect (a defect such as deviation of the hinge 1).

Further, for example, when the sensor 20 is constituted by a dust sensor capable of detecting dust inside the hinge 1, in a case where the amount of dust inside the hinge 1 detected by the sensor 20 is higher than a predetermined threshold, the control unit 21 transmits information on the amount of dust detected by the sensor 20 and information on the time when the sensor 20 has detected the amount of dust to the outside. In this manner, it is possible to cause the external person to grasp that there is a possibility that dust has entered the hinge 1 due to a defect (a defect such as deviation of the hinge 1).

Further, for example, when the sensor 20 is constituted by an illumination sensor capable of detecting illuminance inside the hinge 1, in a case where the illumination inside the hinge 1 detected by the sensor 20 is higher (brighter) than a treatment threshold, the control unit 21 transmits information on the illuminance inside the hinge 1 detected by the sensor 20 and information on the time when the sensor 20 has detected the illuminance inside the hinge 1 to the outside. In this manner, it is possible to cause the external person to grasp that there is a possibility that light has entered the hinge 1 due to a defect (a defect such as deviation of the hinge 1).

The predetermined threshold can be set in a plurality of stages, and the control unit 21 can also be set to determine whether or not the change in the external environment detected by the sensor 20 is higher than the predetermined threshold in each of the plurality of stages. For example, the predetermined thresholds in the plurality of stages are configured in two stages: a first-stage threshold having a relatively low value and a second-stage threshold having a relatively high value. With such a configuration, it is possible to cause the external person to sequentially grasp a state where the degree of abnormality of the change in the external environment detected by the sensor 20 is relatively low and a state where the degree of abnormality is relatively high.

It is also possible to set such that the predetermined threshold is changed in accordance with the state of the hinge 1 (e.g., the open/closed state of the second wing member, a time zone, etc.), and the control unit 21 determines whether or not the change in the external environment detected by the sensor 20 is higher than the predetermined threshold having been changed above. For example, the predetermined threshold is set to the relatively low first-stage threshold when the second wing member is in the closed state, and the predetermined threshold is set to the relatively high second-stage threshold when the second wing member is in the open state. With such a configuration, for example, the information on the change in the external environment detected by the sensor 20 and the information on the time when the sensor 20 has detected the change in the external environment are transmitted to the outside in a state where the degree of abnormality of the change in the external environment detected by the sensor 20 is relatively low when the second wing member is in the closed state, and are transmitted to the outside in a state where the degree of abnormality of the change in the external environment detected by the sensor 20 is relatively high when the second wing member is in the open state.

It is also possible to set such that in a case where the control unit 21 determines whether or not the change in the external environment detected by the sensor 20 is higher than the predetermined threshold, when the control unit 21 determines that "the change in the external environment detected by the sensor 20 is higher than a predetermined threshold" a plurality of times within a predetermined time (e.g., three times within 10 minutes), the control unit 21 transmits the information on the change in the external environment detected by the sensor 20 when the change is higher than the predetermined threshold and the information on the time when the sensor 20 has detected the change in the external environment to the outside. With such a configuration, when the degree of abnormality of the change in the external environment detected by the sensor 20 is not actually high, it is possible to prevent the control unit 21 from determining that the change in the external environment detected by the sensor 20 based on noise or the like is higher than the predetermined threshold and from transmitting the information to the outside.

It is also possible to set such that in a case where the control unit 21 determines whether or not the change in the external environment detected by the sensor 20 is higher than the predetermined threshold, the control unit 21 performs the operation of determining whether or not the change in the external environment detected by the sensor 20 is higher than the predetermined threshold only when the second wing member is in the closed state. With such a configuration, for example, in a case where various pieces of equipment such as the box member 2 provided with the hinge 1 are ones that greatly exhibit a change in the external environment despite there being no defect when the second wing member is in the open state, it is possible to prevent the external transmission of such confusing information at the time of the second wing member being in the open state.

It is also possible to set such that in a case where the control unit 21 determines whether or not the change in the external environment detected by the sensor 20 is higher than the predetermined threshold, the control unit 21 performs the operation of determining whether or not the change in the external environment detected by the sensor 20 is higher than the predetermined threshold only when the second wing member is in the open state. With such a configuration, for example, in a case where various pieces of equipment such as the box member 2 provided with the hinge 1 are ones that greatly exhibit a change in the external environment despite there being no defect when the second wing member is in the closed state, it is possible to prevent the external transmission of such confusing information at the time of the second wing member being in the open state.

The sensor placement chamber 22 can also be configured to come into a sealed state when the second wing member is in the closed state. That is, since the sensor placement chamber 22 comes into the sealed state when the second wing member is in the closed state, the sensor 20 cannot detect the change in the external environment outside the sensor placement chamber 22. Further, the sealed state of the sensor placement chamber 22 is released when the second wing member is in the open state, and the sensor 20 can detect the change in the external environment outside the sensor placement chamber 22.

With such a configuration, for example, in a case where various pieces of equipment such as the box member 2 provided with the hinge 1 have a relatively low concentration of a gas to be detected while the lid 2b is closed, and have a relatively high concentration of the gas to be detected while the lid 2b is open, when the second wing member is in the open state, the sealed state of the sensor placement chamber 22 can be released to bring the sensor 20 into the state of being able to detect the gas to be detected, and when the second wing member is in the closed state, the sensor 20 can be prevented from deteriorating at an early stage by being exposed to a high-concentration gas to be detected, or the like.

The sensor placement chamber 22 can also be configured to be in the sealed state when the second wing member is in the open state (or when the second wing member is in the maximum open state (e.g., the rotation angle θ=180 degrees)). That is, since the sensor placement chamber 22 comes into the sealed state when the second wing member is in the open state, the sensor 20 cannot detect the change in the external environment outside the sensor placement chamber 22. Further, the sealed state of the sensor placement chamber 22 is released when the second wing member is in the closed state, and the sensor 20 can detect the change in the external environment outside the sensor placement chamber 22.

With such a configuration, for example, in a case where various pieces of equipment such as the box member 2 provided with the hinge 1 have a relatively low concentration of a gas to be detected while the lid 2b is open, and have a relatively high concentration of the gas to be detected while the lid 2b is closed, when the second wing member is in the open state, the sealed state of the sensor placement chamber 22 can be released to bring the sensor 20 into the state of being able to detect the gas to be detected, and when the second wing member is in the open state, the sensor 20 can be prevented from deteriorating at an early stage by being exposed to a high-concentration gas to be detected, or the like.

INDUSTRIAL APPLICABILITY

The present invention is utilized for a hinge that openably links a second linked object to a first linked object, and for a hinge monitoring method.

REFERENCE SIGNS LIST

1 Hinge
2 Box member
2a Body
2b Lid
10 Lower fixing member
11 Intermediate member
12 Upper fixing member
13 Upper rotary shaft
14 Lower rotary shaft
15 Cam member
16 Spring
17 Upper slider
18 Lower slider
19 Damper
20 Sensor
21 Control unit
22 Sensor placement chamber

The invention claimed is:

1. A hinge comprising:
a first wing member linked to a first linked object; and a second wing member linked to a second linked object, the hinge being rotatably linking the second linked object to the first linked object,
the hinge comprising:
a sensor that detects a predetermined change in an external environment in the hinge or around the hinge; and
a control unit that transmits, through a communication network to an outside, information on the change in the external environment detected by the sensor,
wherein
the sensor is constituted by at least any one of an odor sensor that detects a predetermined component constituting an odor, a gas sensor that detects a predetermined gas, a dust sensor that detects an amount of dust, and an illumination sensor that detects illumination,
the control unit determines whether or not the external environment change detected by the sensor is higher than the predetermined threshold,
when the external environment change detected by the sensor is higher than the predetermined threshold, the control unit transmits the information on the change in the external environment detected by the sensor to the outside, the predetermined threshold can be set in a plurality of stage, and the control unit can also be set to determine whether or not the external environment change detected by the sensor is higher than the predetermined threshold in each of the plurality of stage.

2. A monitoring method for a hinge that includes a first wing member linked to a first linked object, and a second wing member linked to a second linked object, the hinge being rotatably linking the second linked object to the first linked object, a sensor provided in the hinge, detecting a predetermined change in an external environment in the hinge or around the hinge; and a control unit transmitting, through a communication network to an outside, information on the change in the external environment detected by the sensor, wherein the hinge is constituted by at least any one of an odor sensor that detects a predetermined component constituting an odor, a gas sensor that detects a predetermined gas, a dust sensor that detects an amount of dust, and an illumination sensor that detects illumination, the control unit determines whether or not the external environment change detected by the sensor is higher than the predetermined threshold, when the external environment change detected by the sensor is higher than the predetermined threshold, the control unit transmits the information on the change in the external environment detected by the sensor to the outside, the predetermined threshold can be set in a plurality of stage, and the control unit can also be set to determine whether or not the external environment change detected by the sensor is higher than the predetermined threshold in each of the plurality of stage.

* * * * *